(12) United States Patent
Bossard et al.

(10) Patent No.: US 7,972,417 B2
(45) Date of Patent: Jul. 5, 2011

(54) HYDROGEN GAS SEPARATOR SYSTEM HAVING A MICRO-CHANNEL CONSTRUCTION FOR EFFICIENTLY SEPARATING HYDROGEN GAS FROM A MIXED GAS SOURCE

(76) Inventors: Peter R. Bossard, Ivyland, PA (US); Jacob Mettes, Boulder, CO (US)

( * ) Notice: Subject to any disclaimer, the term of this patent is extended or adjusted under 35 U.S.C. 154(b) by 482 days.

(21) Appl. No.: 12/053,528

(22) Filed: Mar. 21, 2008

(65) Prior Publication Data
US 2008/0163753 A1    Jul. 10, 2008

Related U.S. Application Data

(63) Continuation-in-part of application No. 11/097,535, filed on Mar. 31, 2005, now Pat. No. 7,396,385.

(51) Int. Cl.
*B01D 53/22*    (2006.01)
(52) U.S. Cl. ....................... 95/55; 96/8; 96/10
(58) Field of Classification Search ................ 95/43, 45, 95/55, 56; 96/4, 7, 8, 9, 10
See application file for complete search history.

(56) References Cited

U.S. PATENT DOCUMENTS

| | | | |
|---|---|---|---|
| 5,614,001 A | 3/1997 | Kosaka et al. | 96/10 |
| 5,931,987 A * | 8/1999 | Buxbaum | 95/55 |
| 5,997,594 A | 12/1999 | Edlund et al. | 48/76 |
| 6,394,043 B1 * | 5/2002 | Bool et al. | 122/488 |
| 6,461,408 B2 | 10/2002 | Buxbaum | 95/55 |
| 6,569,226 B1 * | 5/2003 | Dorris et al. | 95/56 |
| 7,393,384 B2 * | 7/2008 | Gopalan et al. | 95/55 |

* cited by examiner

*Primary Examiner* — Robert A Clemente
(74) *Attorney, Agent, or Firm* — LaMorte & Associates, P.C.

(57) ABSTRACT

A hydrogen purification method that is used to separate hydrogen gas from a source gas. A hydrogen separator into which flows the source. Within the hydrogen separator is at least one hydrogen permeable tube that is made of a hydrogen permeable material. A support tube is provided for each hydrogen permeable tube. A support tube is coaxially aligned with the hydrogen permeable tube, wherein a micro-channel exists between the hydrogen permeable tube and the support tube in an area of overlap. The source gas is introduced into the micro-channel. The source gas spreads thinly over the hydrogen permeable tube in the micro-channel. The restrictions of the micro-channel cause the source gas to embody turbulent flow characteristics as it flows through the micro-channel. The turbulent flow causes the hydrogen separator to separate hydrogen from the source gas in a highly efficient manner.

17 Claims, 7 Drawing Sheets

HYDROGEN GAS SEPARATOR SYSTEM HAVING A MICRO-CHANNEL CONSTRUCTION FOR EFFICIENTLY SEPARATING HYDROGEN GAS FROM A MIXED GAS SOURCE

RELATED APPLICATIONS

This application is a continuation-in-part of U.S. patent application Ser. No. 11/097,535, entitled System And Method For Efficiently Separating Hydrogen Gas From A Mixed Gas Source, filed Mar. 31, 2005 now U.S. Pat. No. 7,396,385.

BACKGROUND OF THE INVENTION

1. Field of the Invention

The present invention relates to systems and methods that are used to separate molecular hydrogen from a volume of gas. More particularly, the present invention is related to systems and methods that separate hydrogen from a volume of mixed gas by exposing the mixed gas to a hydrogen permeable material through which only atomic hydrogen can readily pass.

2. Prior Art Description

In industry, there are many applications for the use of molecular hydrogen. However, in many common processes that produce hydrogen, the hydrogen gas produced is not pure. Rather, when hydrogen is produced, the resultant gas is often contaminated with water vapor, hydrocarbons and/or other contaminants. In many instances, however, it is desired to have ultra pure hydrogen. In the art, ultra pure hydrogen is commonly considered to be hydrogen having purity levels of at least 99.999%. In order to achieve such purity levels, hydrogen gas must be actively separated from its contaminants.

In the prior art, one of the most common ways to purify contaminated hydrogen gas is to pass the gas through a membrane made of a hydrogen permeable material, such as palladium or a palladium alloy. As the contaminated hydrogen gas passes through the membrane, atomic hydrogen permeates through the walls of the conduit, thereby separating from the contaminants. In such prior art processes, the membrane is typically heated to at least three hundred degrees centigrade. Molecular hydrogen disassociates into atomic hydrogen on the surface of the membrane and the material of the membrane absorbs the atomic hydrogen. The atomic hydrogen permeates through the membrane from a high pressure side of the membrane to a low pressure side of the membrane. Once at the low pressure side of the membrane, the atomic hydrogen recombines to form molecular hydrogen. The molecular hydrogen that passes through the membrane can then be collected for use. Such prior art systems are exemplified by U.S. Pat. No. 5,614,001 to Kosaka et al., entitled Hydrogen Separator, Hydrogen Separating Apparatus And Method For Manufacturing Hydrogen Separator.

In the prior art, hydrogen permeable membranes are commonly formed as coiled tubes. The flow rate of hydrogen gas through the walls of a coiled tube is proportional to the length of the coiled tube and the thickness of the walls of the coiled tube. Thus, a highly efficient purification system would have a very long, very thin conduit to maximize flow rate. However, palladium is a very expensive precious metal. Consequently, tubes made of palladium and palladium alloys are very expensive to manufacture. As such, it is desirable to use as little of the palladium as possible in manufacturing a hydrogen gas purification system. Furthermore, tubes made from palladium and palladium alloys typically hold gas under pressure and at high temperatures. Accordingly, the walls of the tube cannot be made too thin, otherwise the conduit will either rupture or collapse depending upon the pressure gradient present across the wall of the tube.

Although coiled tubes are often used in prior art separators, there are many disadvantages associated with the use of coiled tubing. In order for a palladium based hydrogen separator to work, it must be heated to a temperature in excess of 300 degrees Centigrade. As palladium coils are heated to such temperatures, they expand. Furthermore, as hydrogen diffuses through the walls of the palladium coils, the palladium expands significantly. As a palladium coil is repeatedly expanded and contracted, the palladium coil twists. The twisting of the palladium coils fatigues the palladium and causes the palladium to become brittle. Eventually, a palladium coil will crack and the hydrogen separator will cease to work.

Another disadvantage of hydrogen separators that use coiled palladium tubing is that the coils of palladium are very susceptible to vibration damage. The palladium coils within a hydrogen separator act as springs. If the hydrogen separator experiences any vibrations during operation, those vibrations resonate within the palladium coils, causing the palladium coils to move. As the palladium coils resonate and move, the palladium experiences fatigue and becomes brittle. This eventually causes the palladium coils to crack and fail.

Yet another disadvantage of hydrogen separators that use palladium coils is that of contaminant gas back-up. If a hydrocarbon rich gas is introduced into a palladium coil, some hydrogen will disassociate from the hydrocarbon and will pass through the wall of the palladium coil. What is left behind in the palladium coil is mostly carbon and oxygen, which forms carbon dioxide and carbon monoxide. The carbon dioxide and carbon monoxide fill the palladium tube. New hydrocarbon gas must therefore diffuse through this contaminant gas before it can reach the surface of the palladium coil. If there is a large back-up of contaminant gas, the hydrocarbons may take a very long time to reach a palladium surface. Hydrogen in the supply gas must be able to reach the palladium surface in a time frame that is short compared to the residence time of gas in the coil. However, the concentration of the non-hydrogen component in the supply gas will increase gradually as more and more hydrogen is removed as the gas stream progresses through the coil. This greatly reduces the efficiency of the hydrogen separator. If the flow in the palladium gas is increased to flush out contaminant gas, hydrocarbons may flow through the palladium tubing before ever having a chance to lose hydrogen through the palladium. This too greatly reduces the efficiency of the hydrogen separator.

To further complicate matters, tubing made from palladium and palladium alloys may become less efficient over time as the interior walls of the tubing become clogged with contaminants. In order to elongate the life of such conduits, many manufacturers attempt to clean the tubing by reverse pressurizing the conduits. In such a procedure, the exterior of the tubing is exposed to pressurized hydrogen. The hydrogen passes through the tube wall and into the interior of the tube. As the hydrogen passes into the interior of the tube, the hydrogen may remove some of the contaminants that have deposited on the interior wall of the tube.

Due to the generally cylindrical shape of most tubing, the tubes are capable of withstanding a fairly high pressure gradient when the interior of the tube is pressurized higher than the exterior of the tube. However, when such tubing is cleaned and the external pressure of the tubing is raised higher than the interior pressure, a much lower pressure gradient must be used, otherwise the tubing will implode.

In an attempt to eliminate the stated disadvantages that occur with the use of coiled tubing, hydrogen separators have been designed that use segments of straight tubing. For instance, in U.S. Pat. No. 5,997,594, to Edlund, entitled Steam Reformer With Internal Hydrogen Purification, a straight segment of palladium tubing is placed inside a larger tube. Gas is then caused to flow through the larger tube. Hydrogen from the gas permeates into the palladium tube, where it is collected.

The opposite configuration is shown U.S. Pat. No. 6,461,408 to Buxbaum, entitled, Hydrogen Generator. In the Buxbaum design, a small diameter tube is placed inside a straight length of palladium tubing. Gas is introduced into the palladium tubing. Hydrogen from the gas permeates out of the palladium tubing and is collected. The remaining waste gas is removed by the small diameter tube.

In prior art systems like are shown in both the Edlund patent and the Buxbaum patent, gas is caused to flow either along the inside of a palladium tube or outside a palladium tube. However, in both prior art designs, the space though which the gas flows is large. This allows the gas to have a laminar flow as it passes along the length of the palladium tube. Due to the laminar flow characteristics of the passing gases, there is very little turbulence in the flowing gases. The laminar flow pattern prevents much gas from even contacting the surfaces of the palladium tube before the gases flow out of the palladium tubing. Accordingly, much of the hydrogen that may be contained in the flowing gas never has the opportunity to be absorbed by the palladium tubing. The hydrogen is merely flushed through the palladium tubing. The overall efficiency of the hydrogen separator therefore remains low.

A need therefore exists for a hydrogen separator that optimizes the exposure of gas to palladium surfaces, thereby minimizing the need for hydrogen to diffuse through contaminant gases.

Furthermore, a need exists for a hydrogen separator that enables a large concentration of hydrocarbon gas to pass through palladium tubing without developing laminar flow characteristics that cause the hydrocarbons to be swept out of the palladium tubing by the flow of gas.

These needs are met by the present invention as described and claimed below.

SUMMARY OF THE INVENTION

The present invention is a hydrogen purification system that is used to separate hydrogen gas from a source gas. The hydrogen purification system includes a hydrogen separator into which the source gas is permitted to flow. Within the hydrogen separator is at least one hydrogen permeable tube having an open first end and a closed second end. Each hydrogen permeable tube is made of a hydrogen permeable material, such as palladium or a palladium alloy.

A support tube is provided for each hydrogen permeable tube. A support tube is coaxially aligned with the hydrogen permeable tube. The support tube has an exterior diameter that is just slightly smaller than the interior diameter of the surrounding hydrogen permeable tube. According, when the support tube is placed inside the hydrogen permeable tube, only a small micro-channel exists between the interior of the hydrogen permeable tube and the exterior of the support tube.

The source gas is introduced into the micro-channel. The source gas spreads thinly over the hydrogen permeable tube in the micro-channel. The flow restrictions caused by the dimensions of the micro-channel cause the source gas to have turbulent flow characteristics as it flows through the micro-channel. The turbulent flow characteristics cause most every molecule of gas in the source gas to contact the hydrogen permeable tube at some point within the micro-channel. Hydrogen from the source gas therefore has a high probability of passes through the hydrogen permeable tube. This significantly increases the efficiency of the hydrogen separator.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

The present invention system provides a means for purifying a hydrogen gas at a high flow rate, using a small amount of space and a small amount of precious metals.

Figure 1:
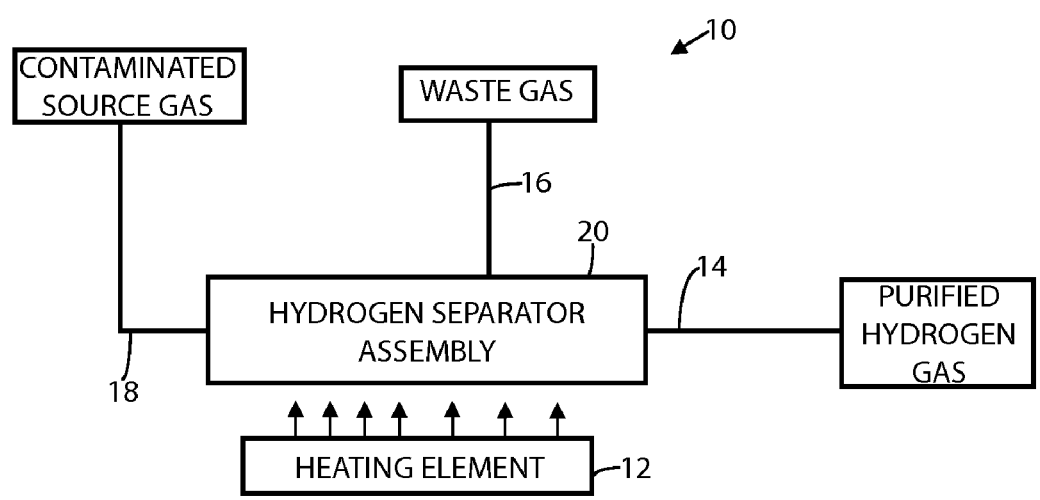
FIG. 1 is a schematic of an exemplary embodiment of a hydrogen purification system.

Referring to FIG. 1, there is shown a schematic of an exemplary embodiment of a hydrogen purification system 10 in accordance with the present invention. The hydrogen purification system 10 contains a hydrogen separator 20. The hydrogen separator 20 is coupled to a source of contaminated gas that contains hydrocarbons or contaminated hydrogen gas. For example, the contaminated source gas can be heated diesel fuel, ethanol, gasoline or simply hydrogen mixed with water vapor.

The hydrogen separator 20 is heated to an operating temperature by external heating elements 12. The hydrogen separator 20 separates hydrogen from the contaminated source gas, thereby producing ultra pure hydrogen and waste gas. The ultra pure hydrogen is collected though a first collection port 14. The waste gas is collected through a second waste gas collection port 16.

Figure 2:
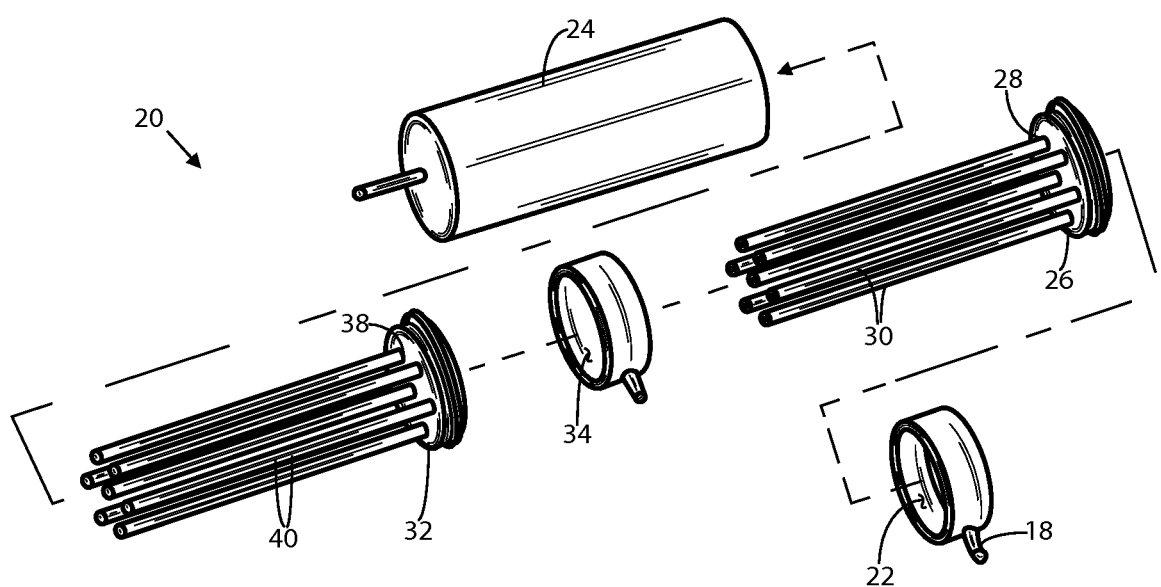
FIG. 2 is an exploded view of an exemplary hydrogen separator.

The contaminated source gas enters the hydrogen separator 20 through a supply port 18. Referring to FIG. 2, in conjunction with FIG. 3, it can be seen that the supply port 18 leads into a plenum chamber 22 at one end of an enclosed housing 24. The enclosed housing 24 is preferably made of stainless steel or another high strength alloy that is non-reactive to any of the component gases contained within the contaminated source gas.

The plenum chamber 22 is defined between the interior of the enclosed housing 24 and a first perforated wall 26. The perforated wall 26 contains a plurality of holes 28 that are symmetrically arranged in a highly space efficient manner. The holes 28 are preferably spaced as densely as possible while still maintaining a predetermined minimum area of material around each of the holes 28.

A plurality of support tubes 30 extend from the first perforated wall 26. The support tubes 30 have solid walls with opposing open ends. The support tubes 30 are joined to the first perforated wall 26 at each of the holes 28. In this manner, the holes 28 communicate with the interior of the support tubes 30 and any gas flowing out of the plenum chamber 22 through the first perforated wall 26 must flow through the support tubes 30.

The support tubes 30 have a length nearly as long as the interior of the enclosed housing 24. The support tubes 30 and the perforated wall 26 are preferably made of the same non-reactive material as is the enclosed housing 24. In this manner, the first perforated wall 26, and the support tubes 30 have the same coefficient of thermal expansion as does the enclosed housing 24.

A second perforated wall 32 is disposed within the enclosed housing 24 at a point adjacent to the first perforated wall 26. The second perforated wall 32 creates two additional chambers within the enclosed housing 24 in addition to the plenum chamber 22. A waste gas collection chamber 34 is created between the first perforated wall 26 and the second perforated wall 32. Lastly, a hydrogen collection chamber 36 is created between the second perforated wall 32 and the second end of the enclosed housing 24.

The second perforated wall 32 defines a plurality of holes 38 that are slightly larger than the diameter of the support tubes 30 that are extending from the first perforated wall 26. The holes 38 in the second perforated wall 32 are aligned with the support tubes 30, thereby allowing the support tubes 30 to extend through the second perforated wall 32.

A plurality of hydrogen permeable tubes 40 are coupled to the second perforated wall 32. The hydrogen permeable tubes 40 are aligned with the holes 38 in the second perforated wall 32 and pass around the support tubes 30. It will therefore be understood that the hydrogen permeable tubes 40 are coaxially aligned with the support tubes 30 and surround the support tubes 30. The hydrogen permeable tubes 40 are preferably palladium or a palladium based alloy, such as a palladium/silver alloy.

Figure 4:
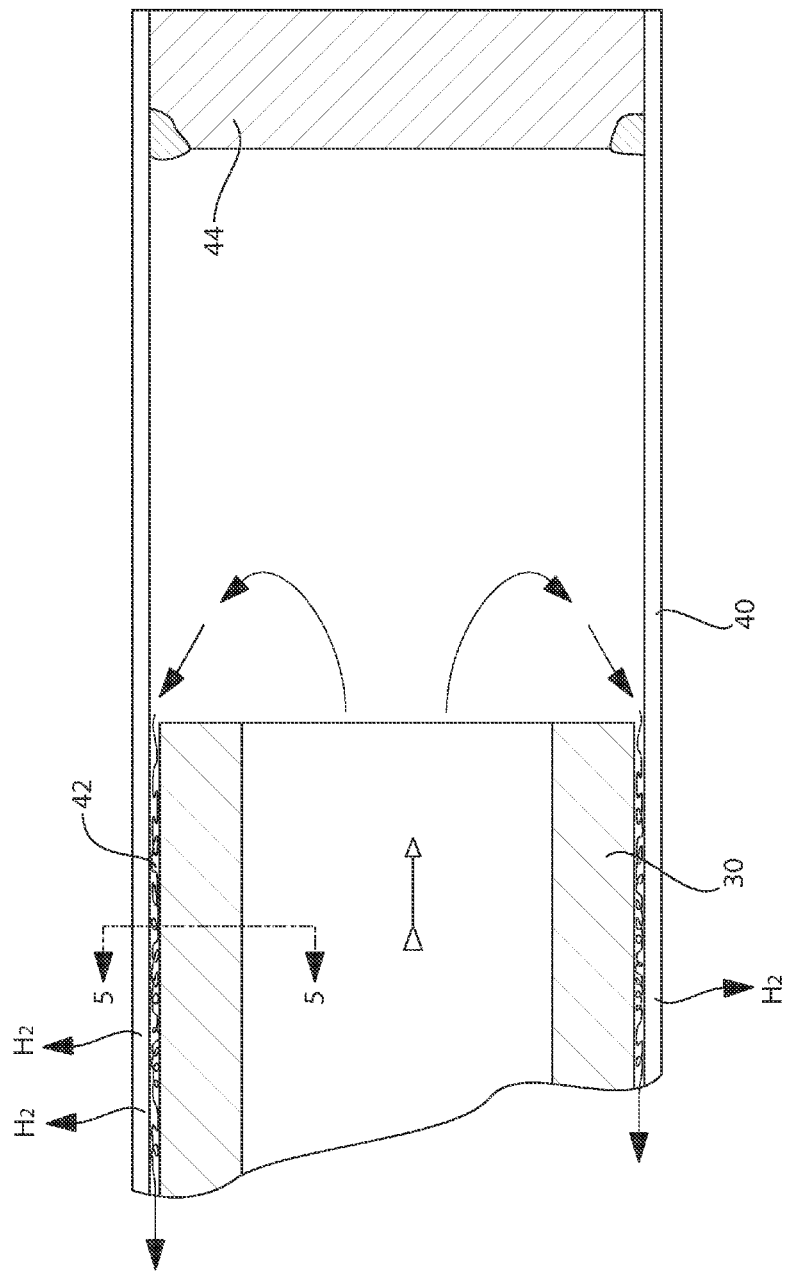
FIG. 4 is an enlarged view of section 4, shown in FIG. 3.
Figure 5:
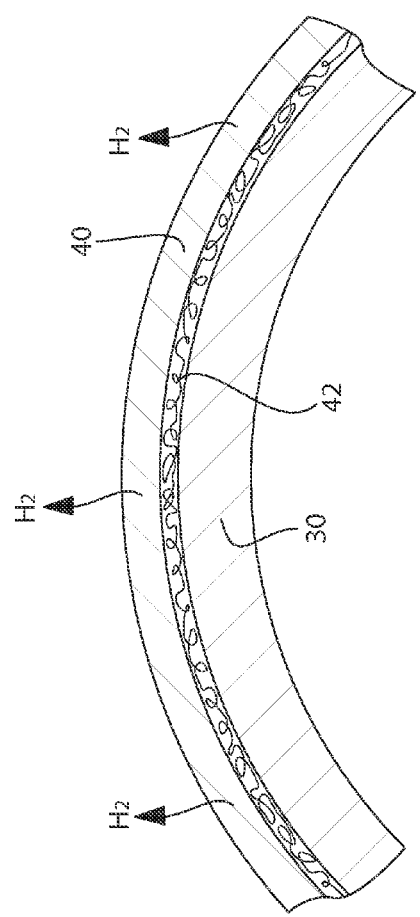
FIG. 5 is an enlarged view of section 5, shown in FIG. 4.

Referring to FIG. 4 in conjunction with FIG. 5, it can be seen that the inside diameter of each hydrogen permeable tube 40 is only slightly larger than the outside diameter of each support tube 30. Consequently, a micro-channel 42 exists between the outside surface of the support tube 30 and the inside surface of the hydrogen permeable tube 40. The micro-channel 42 runs along the length of the support tube 30 in the area that the hydrogen permeable tube 40 overlap the support tube 30. This length is preferably between three inches and twelve inches. The size of the micro-channel 42 is important to the functionality of the hydrogen separator 20. The micro-channel 42 is no larger than 300 microns and is preferably about 250 microns. The preferred flow rate of contaminant source gas through any one micro-channel 42 is preferably between two and three liters per minute. Given a micro-channel 42 this small and a flow rate this high, the contaminated source gas encounters significant friction with the outside surface of the support tube 30 and the inside surface of the hydrogen permeable tubes 40. This friction causes the flow of the contaminant source gas to be completely turbulent within the confines of the micro-channel 42. Since the flow of the contaminant source gas is turbulent in the micro-channel, there exist no significant channels of laminar flow that can sweep the contaminant source gas through the micro-channel 42 without encountering the inside surface of the hydrogen permeable tube 40. Rather, due to the turbulent flow of the contaminant gas within the micro-channel 42, there exist many eddies and flow undulations. As a consequence, nearly every hydrogen molecule contained within the contaminant source gas has a high statistical probability of contacting the inside surface of the hydrogen permeable tube 40. Furthermore, due to the turbulent flow of the contaminant source gas, each hydrogen molecule impacts the inside surface of the hydrogen permeable tube with more energy. Consequently, it is more probable that the hydrogen molecules react with the hydrogen permeable tube 40 and pass through the hydrogen permeable tube 40.

It should be further understood that by providing a very small micro-channel 42, the contaminant source gas is caused to spread very thin as it experiences turbulent flow. The time it takes gas within the micro-channel 42 to reach the hydrogen permeable tube 40 is generally proportional to the square of the micro-channel size. Consequently, by keeping the micro-channel 42 very small, the time it takes hydrogen gas to expose its self to the hydrogen permeable tube 40 remains small. This allows a short and relatively inexpensive hydrogen permeable tube 40 to be used with better efficiencies than are available from long prior art tubes.

The hydrogen permeable tubes 40 are longer than the support tubes 30 they surround. The free ends of the hydrogen permeable tubes 40 are closed. Preferably, the free ends of the hydrogen permeable tubes 40 are not pitched and brazed. Such terminations do not last well with repeating expansion and contraction cycles. In the shown embodiment, an internal end cap 44 is provided. The internal end cap enables the hydrogen preamble tube 40 to be sealed while maintaining its round tubular shape. An internal end cap 40 is internally brazed in place at the end of each of the hydrogen permeable tubes 40. The end caps 44 are preferably brazed to the inside of the hydrogen permeable tubes 40. In this manner, the end caps 44 do not restrict the hydrogen permeable tubes 40 from expanding outwardly when heated and saturated with molecular hydrogen.

The capped ends of each of the hydrogen permeable tubes 40 is also a predetermined distance from the end 45 (FIG. 2) of the enclosed housing 24 (FIG. 2). The predetermined distance is greater than any change in length of the hydrogen permeable tubes 40 caused by temperature and hydrogen swelling. In this manner, the hydrogen permeable tubes 40 are free to expand without restriction.

The hydrogen permeable tubes 40 are straight. Consequently, mechanical stresses caused by differences in thermal and hydrogen expansion between the membrane and its support are eliminated. The hydrogen permeable tubes 40 are supported at one, and only one, fixed point along the length of each tube. This basic concept allows the hydrogen permeable tube 40 to expand freely under varying temperature and hydrogen absorption conditions.

Figure 3:
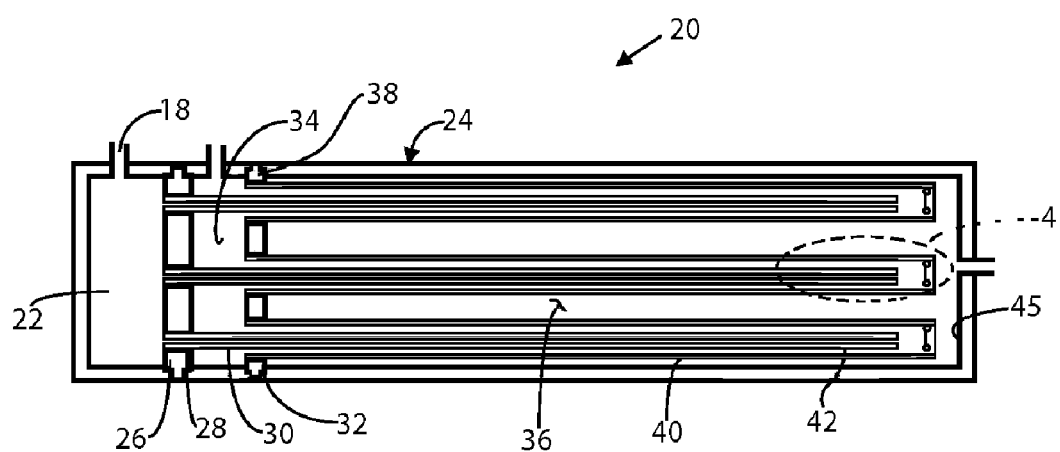
FIG. 3 is a cross-sectional view of the hydrogen separator shown in FIG. 2.

Referring back to both to FIG. 2 in conjunction with FIG. 3 and FIG. 4, it will be understood that in operation, the enclosed housing 24 and all its contents are heated to an operating temperature in excess of 300 degrees Centigrade. A contaminated supply gas is introduced into the plenum chamber 22. The contaminated gas fills the plenum chamber 22 and flows into the support tubes 30 through the first perforated wall 26. The contaminated gas exits the far end of the support tubes 30 and is forced to flow through the micro-channel 42 that exists between the exterior of the support tubes 30 and the interior of the surrounding hydrogen permeable tubes 40. The contaminated supply gas travels through the micro-channel 42 with turbulent flow characteristics. The micro-channel 42 drains into the waste gas collection chamber 34. However, as the contaminated source gas flows through the micro-channel 42, the flowing gas spreads thinly and turbulently over the outside surfaces of the hydrogen permeable tubes 40. The length and width of the micro-channel 42, as well as the gas flow rate, are engineered to maximize the efficiency at which the hydrogen gas permeates through the hydrogen permeable tubes 40. By spreading the contaminated gas thinly and turbulently over the surfaces of the hydrogen permeable tubes 40, the hydrogen contained within the contaminated gas does not have to diffuse far before it contacts hydrogen permeable material. In this manner, a high percentage of the hydrogen available in the contaminated gas is provided with the opportunity to disassociate from the contaminated gas and pass through the hydrogen permeable tubes 40. Depending upon operating parameters, a hydrogen diffusion efficiency in excess of eighty percent can be achieved.

As hydrogen gas passes through the hydrogen permeable tubes 40, the hydrogen gas passes into the collection chamber 36 of the enclosed housing 24. The hydrogen gas in the collection chamber 36 is then drawn out of the collection chamber 36 for use. The hydrogen gas is ultra pure, being that only molecular hydrogen is capable of dissociating from the contaminated source gas and pass through the hydrogen permeable tubes 40.

The non-hydrogen components of the contaminated source gas flow through the micro-channels 42 and into the waste gas collection chamber 34. The waste gas is then drawn out of the hydrogen separator 20. The pressure of the hydrogen gas collection chamber 36 is kept lower than the pressure of the waste gas collection chamber 34. In this manner, there is a positive pressure differential between the micro-channel 42 and the hydrogen collection chamber 36 that encourages the flow of hydrogen through the hydrogen permeable tubes 40 and into the hydrogen collection chamber 36.

The micro-channel 42 is created by the coaxial positioning of the support tubes 30 within the hydrogen permeable tubes 40. However, other advantages are created by such structuring. During normal operation, the hydrogen permeable tubes 40 are internally pressurized, and therefore expand outwardly away from the inner support tubes 30. However, if the hydrogen separator 20 is ever reverse pressurized, either by accident or purposely for cleaning, the hydrogen permeable tubes 40 are externally pressurized and are caused to contract upon the support tubes 30. The micro-channel 42 is very small and enables the hydrogen permeable tubes 40 to contact the support tubes 30 without being damaged. The support tubes 30 provide structural integrity to the hydrogen permeable tubes 40 and prevent the hydrogen permeable tubes 40 from collapsing. The positioning of the support tubes 30 in the hydrogen permeable tubes 40 therefore makes the overall hydrogen separator 20 far more resistant to damage from reverse pressurization.

For a given wall thickness, a small diameter tube can withstand a higher pressure differential across the wall than a larger diameter tube. This is because the stresses experienced by the walls of a tube are equal to the pressure drop over the wall times the tube radius, divided by the wall thickness. A practical hydrogen separator has to pass large gas flows with relatively small losses of pressure drop, which seems to exclude the use of a single, or a small number of, small diameter tubes. Moreover, the exposed wall area in a small diameter tube is relatively small. The present invention addresses these issues by implementing many relatively short, small diameter hydrogen permeable tubes 40 in parallel.

Figure 6:
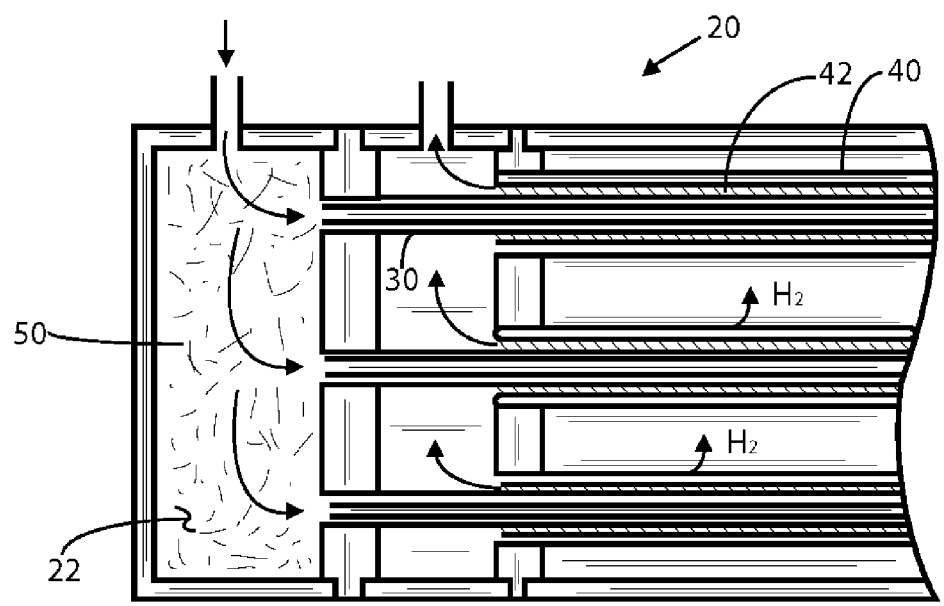
FIG. 6 is a cross-sectional view of an alternate embodiment of a hydrogen separator.

Depending upon the contaminated source gas that is used, it may be desirable to condition the contaminated source gas by passing the contaminated source gas through a catalyst. Referring to FIG. 6, it can be seen that the plenum chamber 22 of the hydrogen separator can be filled with a catalyst 50. Consequently, any gas that flows into the support tubes 30 and into the hydrogen permeable tubes 40 must first flow through the catalyst 50. The catalyst 50 selected is dependent upon the contaminated source gas being used. For example, if the contaminated source gas is petroleum distillate, catalysts such as iron chromium oxide, copper zinc oxide and certain noble metals can be used to help break apart the complex hydrocarbons present in such a gas.

In order to increase the effectiveness of the catalyst 50, the catalyst material can also be introduced into the micro-channel 42 between the support tubes 30 and the hydrogen permeable tubes 40. The positioning of the catalyst 50 in the micro-channel 42 is also shown in FIG. 6. In this manner, contaminated source gas can be effected by the catalyst at the same time that hydrogen is being removed from the contaminant gas. Since the partial pressure of hydrogen gas will be low in the micro-channel 42, the catalyst can be more effective in helping free hydrogen molecules from the hydrocarbons in the gas.

Figure 7:
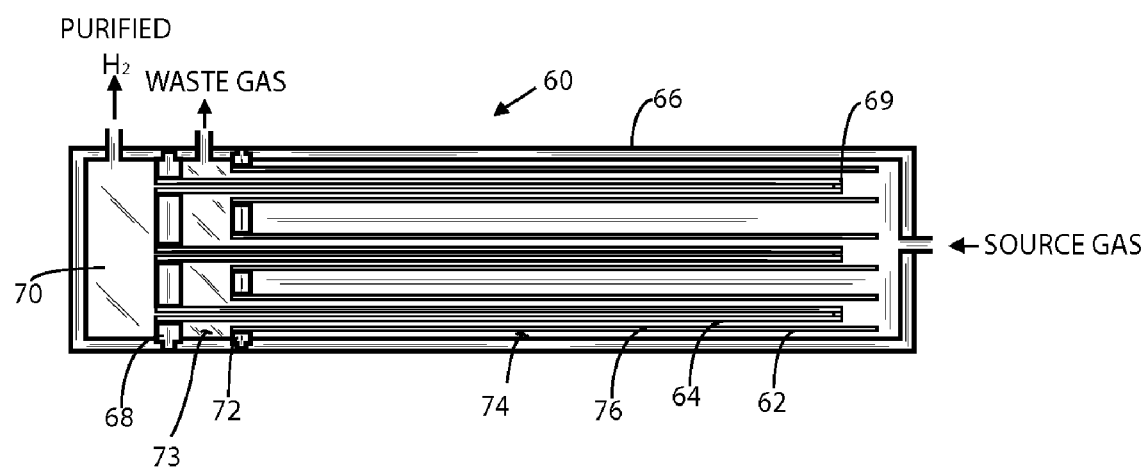
FIG. 7 is a cross-sectional view of another alternate embodiment of a hydrogen separator.

In the embodiments of the present invention thus shown, hydrogen permeable tubes 40 are placed around support tubes 30. Contaminated source gas is then allowed to flow between the support tubes 30 and the hydrogen permeable tubes 40. Referring now to FIG. 7, an alternate embodiment of a hydrogen separator 60 is shown, where support tubes 62 are placed around the outside of hydrogen permeable tubes 64.

In this embodiment, there is an enclosed housing 66. Hydrogen permeable tubes 64 extend from a first perforated wall 68 within the enclosed housing 66. The hydrogen permeable tubes 64 have capped ends 69. A collection chamber 70 is formed between the end of the enclosed housing 66 and the first perforated wall 68. The collection chamber 70 communicates with the interior of the hydrogen permeable tubes 64.

A second perforated wall 72 is positioned within the enclosed housing 66. A waste gas collection chamber 73 is formed between the first perforated wall 68 and the second perforated wall 72. A plurality of support tubes 62 extend from the second perforated wall 72. The support tubes 62 are aligned with the hydrogen permeable tubes 64 and surround the hydrogen permeable tubes 64.

A plenum chamber 74 is formed between the second perforated wall 72 and the far end of the enclosed housing 66. Contaminated source gas is introduced into the plenum chamber 74. The contaminated source gas flows into the support tubes 62 and through a micro-channel 76 that separates the support tubes 62 from the interior hydrogen permeable tubes 64. Hydrogen gas passes through the material of the hydrogen permeable tubes 64 as it turbulently flows through the micro-channels 76. The hydrogen gas passing into the hydrogen permeable tubes 64 is collected in the collection chamber 70. Waste gas that flows through the micro-channels 76 is collected in a waste gas chamber 78 and is removed from the hydrogen separator 60.

It will be understood that the embodiments of the hydrogen separators that are shown are merely exemplary and that a person skilled in the art can make many changes to the shown embodiments. For example, the shown embodiments only have a few support tubes and hydrogen permeable tubes. It will be understood that embodiments of the present invention can be made where hundreds of such tubes are used. It will further be understood that hydrogen permeable tubes can be positioned either inside or outside support tubes, provided a micro-channel exists between the support tubes and the hydrogen permeable tubes. Furthermore, catalysts can be included within the hydrogen separator depending upon the type of gas composition being used as the contaminated source gas. All such variations, modifications and alternate embodiments are intended to be included within the present invention as defined by the claims.

What is claimed is:

1. A method of separating hydrogen gas from a source gas, comprising the steps of:
    providing a tube of hydrogen permeable material having a first end, an inside surface and an inside diameter;
    providing a support tube having an outside surface and an outside diameter, wherein said outside diameter of said support tube is just smaller than said inside diameter of said tube of hydrogen permeable material;
    coaxially positioning said tube of hydrogen permeable material around said support tube creating a micro-channel of less than three hundred microns between said outside surface of said support tube and said inside surface of said tube of hydrogen permeable material;
    providing a catalyst within said micro-channel; and
    passing the source gas through said catalyst and through said micro-channel at a flow rate that causes said source gas to have turbulent flow characteristics while flowing through said micro-channel, wherein hydrogen from said source gas comes into contact with said hydrogen permeable material and is presented the opportunity to be absorbed by said hydrogen permeable material and separated from said source gas.

2. The method according to claim 1, wherein said step of passing the source gas through said micro-channel includes introducing said source gas to said micro-channel through said support tube.

3. The method according to claim 2, wherein said step of coaxially positioning said tube of hydrogen permeable material around said support tube includes inserting said support tube through said first end of said tube of hydrogen permeable material.

4. The method according to claim 3, further including the step of collecting hydrogen gas separated from said source gas.

5. The method according to claim 4, wherein said step of collecting hydrogen gas includes collecting said hydrogen gas from said first end of said tube of hydrogen permeable material.

6. The method according to claim 4, wherein said step of providing a tube of hydrogen permeable material, includes providing a plurality of tubes of hydrogen permeable material, wherein said plurality of tubes communicate with a first common chamber.

7. The method according to claim 6, wherein said step of collecting hydrogen gas includes drawing said hydrogen gas from said first common chamber.

8. A method of separating hydrogen gas from a source gas, comprising the steps of:
    providing a tube of hydrogen permeable material having a first end, an outside surface and an outside diameter;
    providing a support tube having a first end, a second end, an inside surface and an inside diameter, wherein said inside diameter of said support tube is larger than said outside diameter of said tube of hydrogen permeable material;
    coaxially positioning said tube of hydrogen permeable material inside said support tube creating a micro-channel between said inside surface of said support tube and said outside surface of said tube of hydrogen permeable material; and
    passing the source gas through said micro-channel at a flow rate that causes said source gas to have turbulent flow characteristics while flowing through said micro-channel, wherein hydrogen from said source gas comes into contact with said hydrogen permeable material and is absorbed by said hydrogen permeable material, therein being separated from said source gas.

9. The method according to claim 8, wherein said micro-channel extends no more than three-hundred microns between said inside surface of said support tube and said outside surface of said tube of hydrogen permeable material.

10. The method according to claim 8, wherein said step of passing the source gas through said micro-channel includes introducing said source gas to said micro-channel through said support tube.

11. The method according to claim 8, wherein said step of coaxially positioning said tube of hydrogen permeable material inside said support tube includes inserting said first end of said tube of hydrogen permeable material though said second end of said support tube.

12. The method according to claim 11, further including the step of collecting hydrogen gas separated from said source gas.

13. The method according to claim 12, wherein said step of collecting hydrogen gas includes collecting said hydrogen gas from said first end of said tube of hydrogen permeable material.

14. The method according to claim 12, wherein said step of providing a tube of hydrogen permeable material, includes providing a plurality of tubes of hydrogen permeable material, wherein said plurality of tubes communicate with a first common chamber.

15. The method according to claim 14, wherein said step of collecting hydrogen gas includes drawing said hydrogen gas from said first common chamber.

16. In a hydrogen separator that separates hydrogen gas from a source gas, a method of inducing turbulent flow in said source gas as it flows past a hydrogen permeable membrane in order to produce a more efficient absorption of hydrogen from said source gas by said hydrogen permeable membrane, said method comprising:
    providing a hydrogen permeable membrane in the form of hydrogen permeable tube having an open end;
    providing a support tube;
    coaxially aligning said hydrogen permeable tube and said support tube, wherein a micro-channel of no more than three-hundred microns exists between said hydrogen permeable tube and said support tube;
    introducing said source gas into said micro-channel at a flow rate that causes said source gas to have turbulent flow characteristics as it flows through said micro-channel, wherein said hydrogen gas within said source gas permeates through said hydrogen permeable tube and is separated from said source gas; and
    collecting hydrogen gas from said open end of said hydrogen permeable tube.

17. The method according to claim 16, further including the step of introducing said source gas into said micro-channel through said supply tube.

* * * * *